United States Patent
Pinto Filipe et al.

(10) Patent No.: US 9,787,787 B2
(45) Date of Patent: *Oct. 10, 2017

(54) METHOD AND SYSTEM FOR PROCESSING MEASUREMENT DATA FOR WEBSITE STATISTICS

(71) Applicant: Adobe Systems Incorporated, San Jose, CA (US)

(72) Inventors: Joao Manuel Pinto Filipe, Almere (NL); Pleun Christiaan Bel, Bodegraven (NL); Tiago Cipriano Pires, Amsterdam (NL); Zoltan Papp, Amsterdam (NL)

(73) Assignee: Adobe Systems Incorporated, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/176,449

(22) Filed: Jun. 8, 2016

(65) Prior Publication Data

US 2016/0285984 A1 Sep. 29, 2016

Related U.S. Application Data

(63) Continuation of application No. 12/538,666, filed on Aug. 10, 2009, now Pat. No. 9,372,900.

(30) Foreign Application Priority Data

Aug. 8, 2008 (EP) .................. PCT/EP2008/060490

(51) Int. Cl.
*G06F 17/30* (2006.01)
*H04L 29/08* (2006.01)
*H04L 12/26* (2006.01)

(52) U.S. Cl.
CPC ........ *H04L 67/22* (2013.01); *G06F 17/30306* (2013.01); *G06F 17/30536* (2013.01); *H04L 43/062* (2013.01); *H04L 67/02* (2013.01)

(58) Field of Classification Search
None
See application file for complete search history.

(56) References Cited

U.S. PATENT DOCUMENTS

| 5,991,804 | A  | * | 11/1999 | Bolosky ............. G06F 11/1096 707/999.01 |
| 7,890,451 | B2 |   | 2/2011  | Cancel et al. |
| 8,112,458 | B1 |   | 2/2012  | Kumar et al. |
| 8,375,304 | B2 |   | 2/2013  | Swenson et al. |
| 8,447,829 | B1 | * | 5/2013  | Geller ..................... G06F 9/468 709/217 |
| 2005/0120095 | A1 |   | 6/2005 | Aman et al. |
| 2005/0165889 | A1 | * | 7/2005 | Muret .................. C07K 14/705 709/203 |

(Continued)

OTHER PUBLICATIONS

Notice of Allowance in related U.S. Appl. No. 12/538,666, dated Feb. 19, 2016, 18 pages.

*Primary Examiner* — Son T Hoang
(74) *Attorney, Agent, or Firm* — Kilpatrick Townsend & Stockton LLP

(57) ABSTRACT

A method and a system for processing measurement data for website statistics are provided. The measurement data is processed in parallel bucket writers and stored in buckets. Upon receiving a report request the buckets are processed in parallel bucket queriers to obtain report data.

20 Claims, 7 Drawing Sheets

(56) References Cited

U.S. PATENT DOCUMENTS

| | | |
|---|---|---|
| 2006/0277197 A1 | 12/2006 | Bailey |
| 2007/0250618 A1 | 10/2007 | Hammond |
| 2007/0282915 A1* | 12/2007 | Vosshall ............ G06F 17/30575 |
| 2008/0082554 A1* | 4/2008 | Pedersen ........... G06F 17/30011 |
| 2008/0086558 A1 | 4/2008 | Bahadori et al. |
| 2008/0222284 A1 | 9/2008 | Barua et al. |
| 2009/0006607 A1 | 1/2009 | Bu et al. |
| 2009/0197238 A1* | 8/2009 | Moffatt .................... G09B 7/02 434/430 |
| 2011/0161362 A1 | 6/2011 | Lipscombe et al. |

* cited by examiner

METHOD AND SYSTEM FOR PROCESSING MEASUREMENT DATA FOR WEBSITE STATISTICS

CROSS-REFERENCE TO RELATED APPLICATION

This application is a continuation application of U.S. patent application Ser. No. 12/538,666 filed on Aug. 10, 2009, the contents of which are incorporated herein in their entirety.

BACKGROUND

The discussion below is merely provided for general background information and is not intended to be used as an aid in determining the scope of the claimed subject matter.

The increase in electronic commerce over the Internet has resulted in a growing demand for websites to track customer's behavior and activities on these websites. Tracking this activity enables the owners of the website to better understand their customers. Measurement data gathered may e.g. relate to what customers look at, how long they stay, what they buy, how they came on to the website, how they move around on the website or how they interact with the website etc. By studying this measurement data, owners of websites have been able to improve their website by making modifications to the functionality, navigation and design of the website.

Known website statistics solutions process and/or post-process the measurement data using a single processor. Moreover the full measurement data of a site is read in memory for processing. The number of visitors of websites may be very large. This requires high capacity systems in terms of CPU power, memory and storage for processing, storing and post-processing the measurement data.

In view of the above, there is a demand for an improved method for processing measurement data for website statistics.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the background.

According to an aspect of the invention a system is proposed for processing measurement data for website statistics. The system comprises one or more of the following modules: a measuring module for receiving measurement data from a website; a storing module for storing the measurement data in a data storage device; a processing module for processing the measurement data to obtain report data; and a dispatcher module for receiving a report request and/or providing the report data to a client device. The system further comprises at least one bucket writer for parallel processing of the measurement data before storing the measurement data in the storage Thus the system advantageously enables processing and/or storing of measurement data for website statistics, whereby measurement data can be processed by multiple processors or cores, resulting in a shorter processing time and a lower memory usage.

According to an aspect of the invention a method is proposed for processing measurement data for website statistics. The method comprises one or more of the following steps: receiving measurement data from a website; storing the measurement data in a data storage device; processing the measurement data to obtain report data; and receiving a report request and/or providing the report data to a client device. The method further comprises the step of distributing the received measurement data to at least one bucket writer for parallel processing of the measurement data before storing the measurement data in the storage. Preferably the method is a computer implemented method.

Thus the method advantageously enables processing and/or storing of measurement data for website statistics, whereby measurement data can be processed by multiple processors or cores, resulting in a shorter processing time and a lower memory usage.

Other embodiments advantageously enable the measurement data to be stored more efficiently, resulting in a lower storage usage and enabling faster processing of the measurement data for generating a report; only part of the bucket being read for generating a report instead of the complete file container; and/or the buckets to be processed by multiple processors or cores, resulting in a shorter processing time and a lower memory usage.

According to an aspect of the invention a bucket writer is proposed for use in a system having one or more of the above defined features and advantages.

According to an aspect of the invention a bucket querier is proposed for use in a system having one or more of the above defined features and advantages.

According to an aspect of the invention a computer program element is proposed for processing measurement data for website statistics in a system having one or more of the above defined features and which, when being executed by one or more processors, is adapted to carry out one or more steps of the method defined above. The computer program element comprises instructions for processor(s), the instructions being stored on computer readable media such as electronic memory, discs or the like.

Hereinafter, embodiments of the invention will be described in further detail. It should be appreciated, however, that these embodiments may not be construed as limiting the scope of protection for the present invention.

DETAILED DESCRIPTION OF THE ILLUSTRATIVE EMBODIMENT

Figure 1:
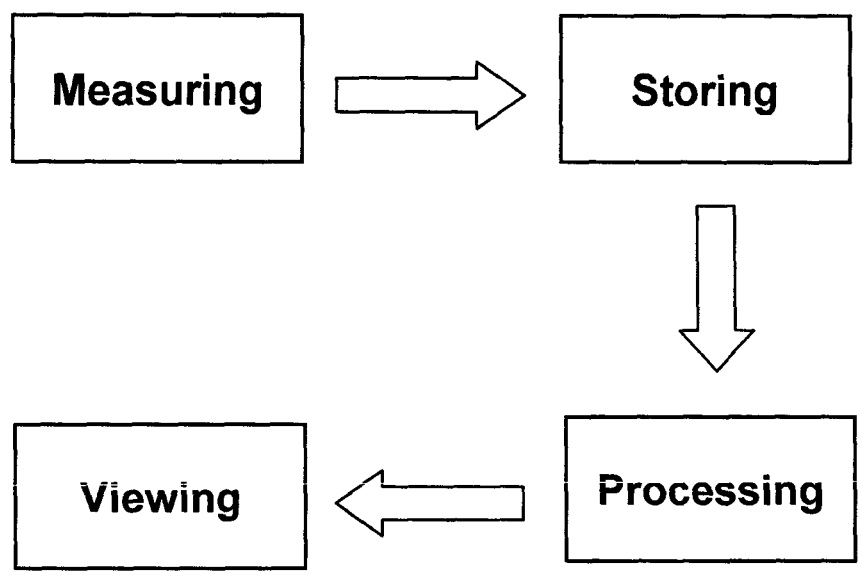
FIG. 1 shows, in high level, the process steps taken to enable website statistics according to an embodiment of the invention.

In general, owners of websites or other parties desire to have detailed information of the visitors of the website. These website visitation data include, but are not limited to, the country of origin of the visitors, the operating system used by the visitor, the search engine used by the visitor, the buying behavior of the visitor, the type of products bought, how visitors navigate in the website etc. FIG. 1 shows, in high level, the process steps performed by computer(s) having one or more processors to enable site statistics to be available. In the measuring step actions or events by a visitor on a website are measured or obtained from which measurement data is generated. In the storing step the measurement data is stored on a data storage device such as at a central server. In the processing step the measurement data is processed to enable reporting of detailed information. In the viewing step, which is also called a dispatcher step, detailed information is rendered to the user such as being prepared and delivered for viewing and/or report(s) are generated.

An aspect of the invention enables measurement data of a site to be partitioned or organized so as to enable parallel processing and/or post-processing of the data. This overcomes performance bottlenecks found in known architectures.

The following terminology is used herein: events (or measurements), visits (sometimes called sessions) and visitors. A visitor is a user of a client's site uniquely identified (by a cookie or IP, for example). An event is a measured action of a visitor. A visit is a chronological sequence of events coming from the same visitor with no more than a certain idle duration (e.g., normally 30 minutes) between two consecutive events.

Figure 2A:
FIG. 2A shows a prior art processing of a query.
Figure 2B:
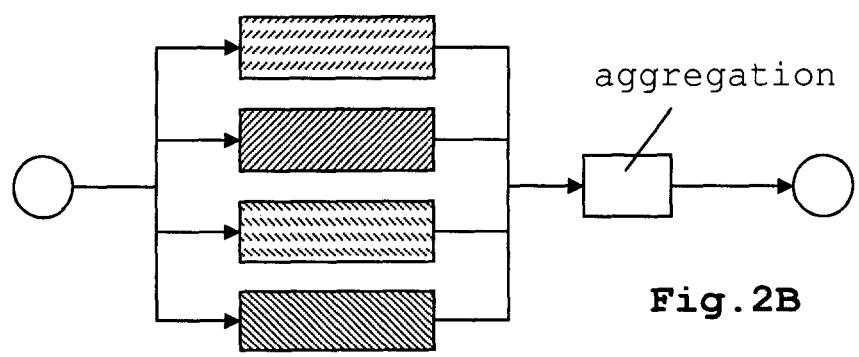
FIG. 2B shows a processing of a query according to an embodiment of the invention.

The site's measurement data is partitioned or organized by dividing it into visitor sets (or visitor buckets, as we call it from now on). This is possible because a visitor's data is independent from another visitor's data—they don't share events and the events of a visitor will not change or influence in any way the events or visits of another visitor. When querying a site, the work is divided through all the buckets and thus parallel processed. This is an example algorithm:

1. While inserting events, break the site into visitor buckets of similar sizes;
2. When querying a site:
    2.1 Distribute the query through all the buckets in different CPUs
    2.2 Collect each bucket result table;
    2.3 Aggregate all bucket tables into a single table FIG. 2A shows a prior art method of processing of a query. FIG. 2B shows processing of the same query according to an embodiment of the invention. In FIG. 2A a site (or data pertaining to the site) is processed sequentially. In FIG. 2B the same site (or data pertaining to the site) is divided or organized among a plurality of buckets (herein by example in four buckets) which are processed in parallel. The aggregation of all the bucket tables is a simple and fast operation. This means that with such architecture, the time needed to process a report item for a site is not dependent on the site size anymore but on the size of the biggest bucket and number of CPUs used. Being able to handle a big site is just a matter of defining enough buckets and using enough hardware to parallelize those buckets processing time.

Figure 3:
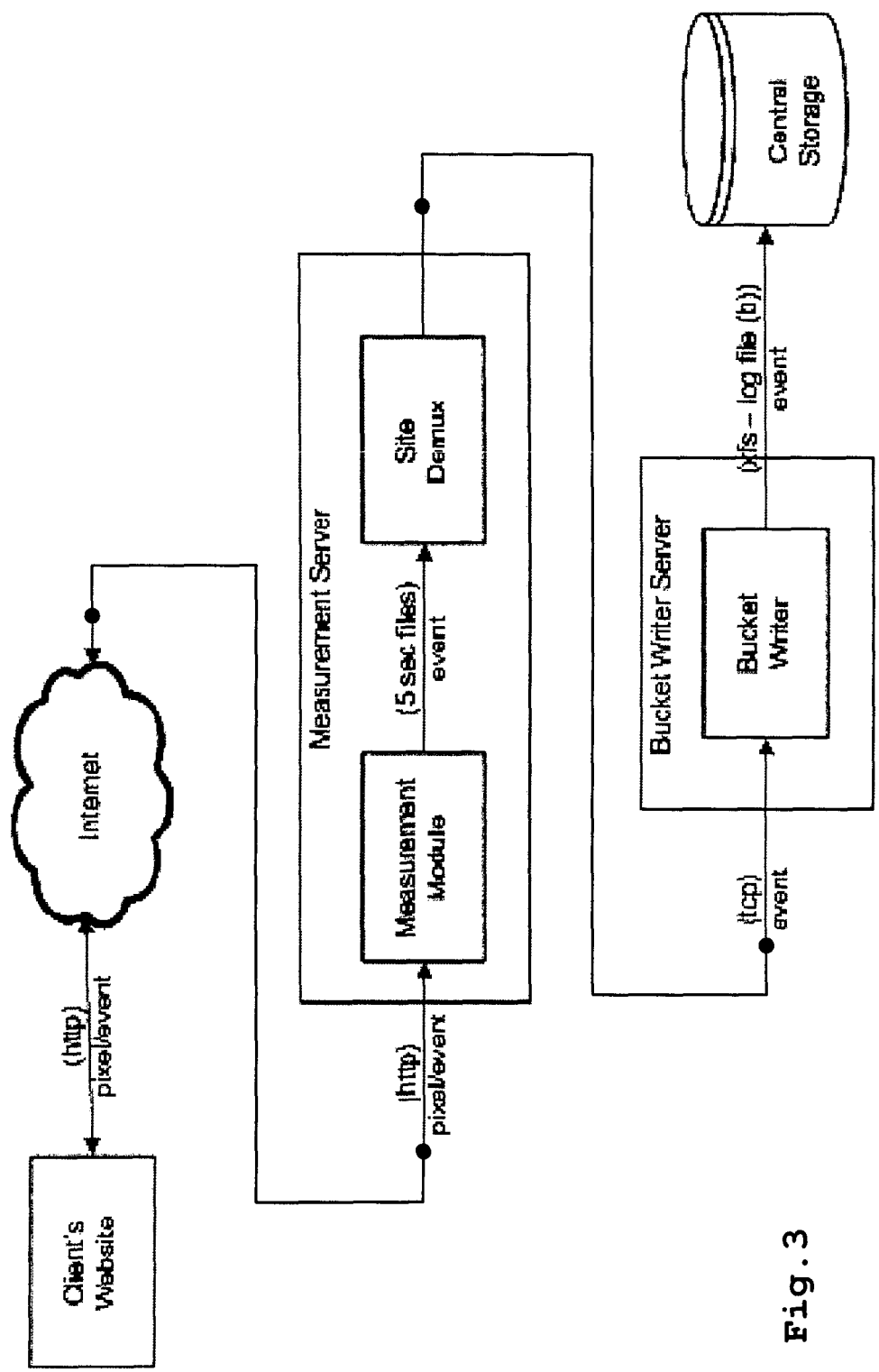
FIG. 3 shows an architectural overview for measuring and storing measurement data according to an embodiment of the invention.

FIG. 3 shows an architectural overview for measuring and storing measurement data according to an embodiment of the invention. In FIG. 3 modules involved in processing measurement data are shown as blocks and denoted "Measurement Module", "Site Demux" and "Bucket Writer", while boxes surrounding these modules represent exemplary types of server machines. These modules as well as others herein described can be implemented on a computer having processor(s) that executes instructions stored on computer readable media. The arrows between modules represent data flow. The top legend of an arrow (between brackets) describes an exemplary protocol that can be used. The bottom legend of an arrow represents the type of data being transferred. When the dataflow has two directions, the information is separated by a "/". We use "b" to represent an index value for a "bucket". Http requests are load-balanced to a group of servers with the respective module installed.

The Measurement Module collects the events by the visitors on the client's site(s). These events are written into log files having a time period such as a 5-second log file. The Site Demux module reads the log files and distributes the events to the right "Bucket Writer" based upon the site of the event. Preferably each "Measurement Module" instance has a "Site Demux" associated and running on the same machine. The name of the "Site Demux" module comes from "Demultiplexing on site". Each Bucket Writer handles a range of sites. For each site being handled, this module is responsible for defining or identifying the visitor identity (id) of each event, and based on that id, writes the event on the right bucket. Each bucket contains a range of visitor ids (or a range of hash values calculated from the visitor id). A "bucket" as used herein is a directory or file per corporate/site containing for example log files (e.g. one log file per day) with the events. These log files can be "zipped", or otherwise compressed, for example when the day is over. The Central Storage is a logical device with all the storage needed for the log and report (rp) files. The Central Storage is implemented on a storage device such as but not limited to electronic memory and/or other computer data storage device such as a hard disc. It must guarantee enough speed for inserting and querying the data.

Figure 4:
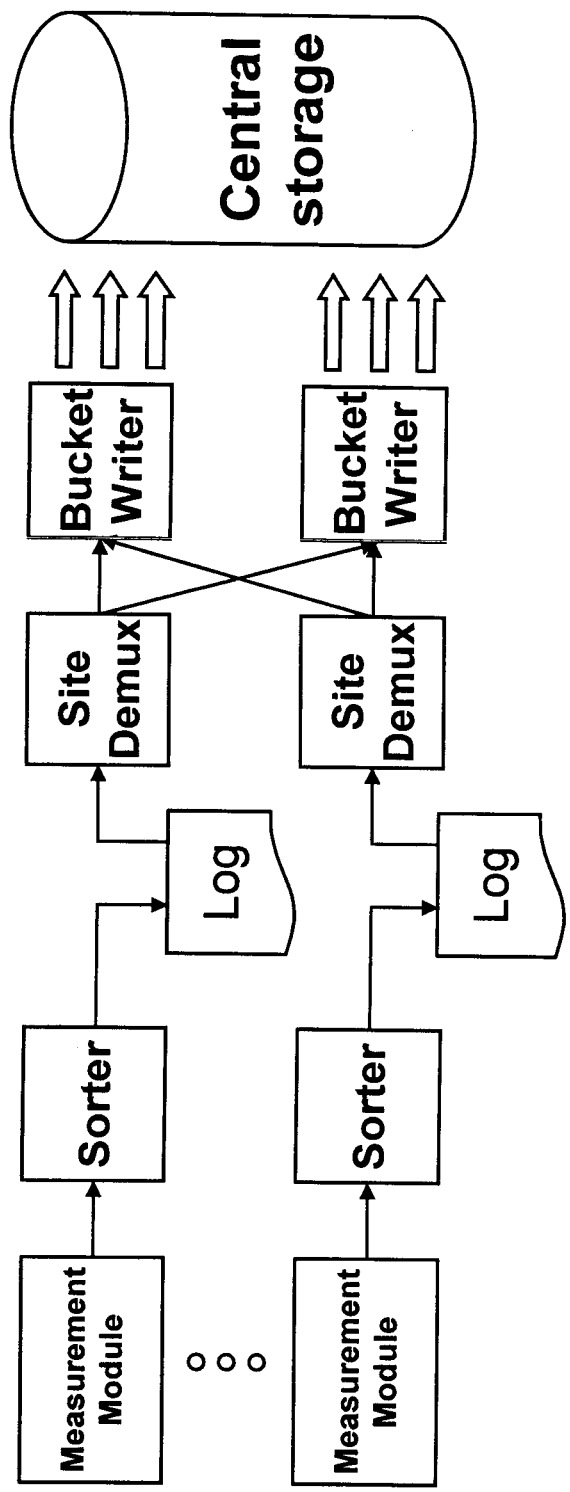
FIG. 4 shows a detail of an architectural overview for measuring and storing measurement data according to an embodiment of the invention.

In FIG. 4 a detail of an architectural overview for measuring and storing measurement data according to an embodiment of the invention is shown. In the example of FIG. 4 each Measurement Module (MM) sends the collected information to a sorter module which sorts on time. Optionally the sorter module writes the information to a local log file. Each log file spans a five second interval. Each MM has a site demux that sends data from the MM to the bucket writer (BW). Each site will always land on the same BW. Measurement data is cut into smaller pieces called buckets. The BW will select a bucket based on the unique visitor id as identified during measurement and write the information to the bucket. A unique visitor ends up in the same file (bucket), so a single visitor can always be found in the same bucket.

In one embodiment, all buckets have a maximum size. The size is chosen in such a way that they are manageable. The number of buckets can be based on the size of the site. The number of buckets typically is a power of 2 (1, 2, 4, 8, 16). For example, if the number of events crosses a predefined number of events per bucket, then the number of buckets will be doubled. However, if the number buckets is doubled, the historical data needs to be recorded over the new total number of buckets as well. Effectively this means that each bucket needs to be split into two.

Figure 5:
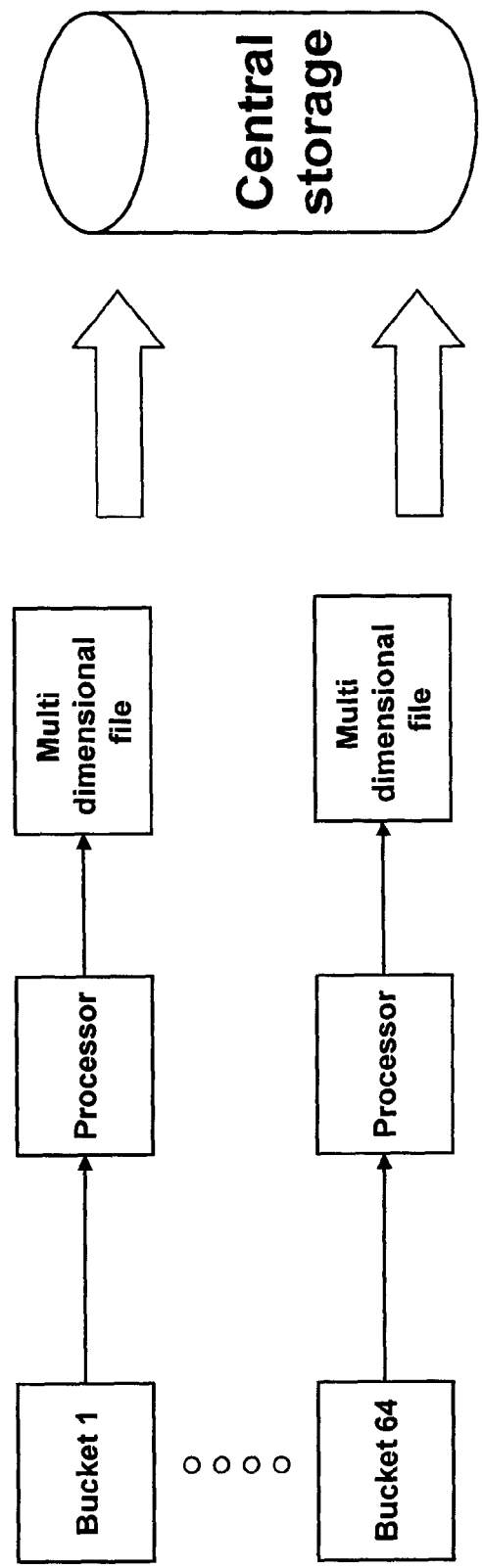
FIG. 5 shows an architectural overview for processing measurement data according to an embodiment of the invention.

FIG. 5 shows an architectural overview for processing measurement data according to an embodiment of the invention. RP files are generated for individual buckets and not for the total site. Preferably one core or processor (CPU) is used per bucket. The processing time depends on the number of buckets; it no longer increases with the size of the site as in the prior art.

Figure 6:
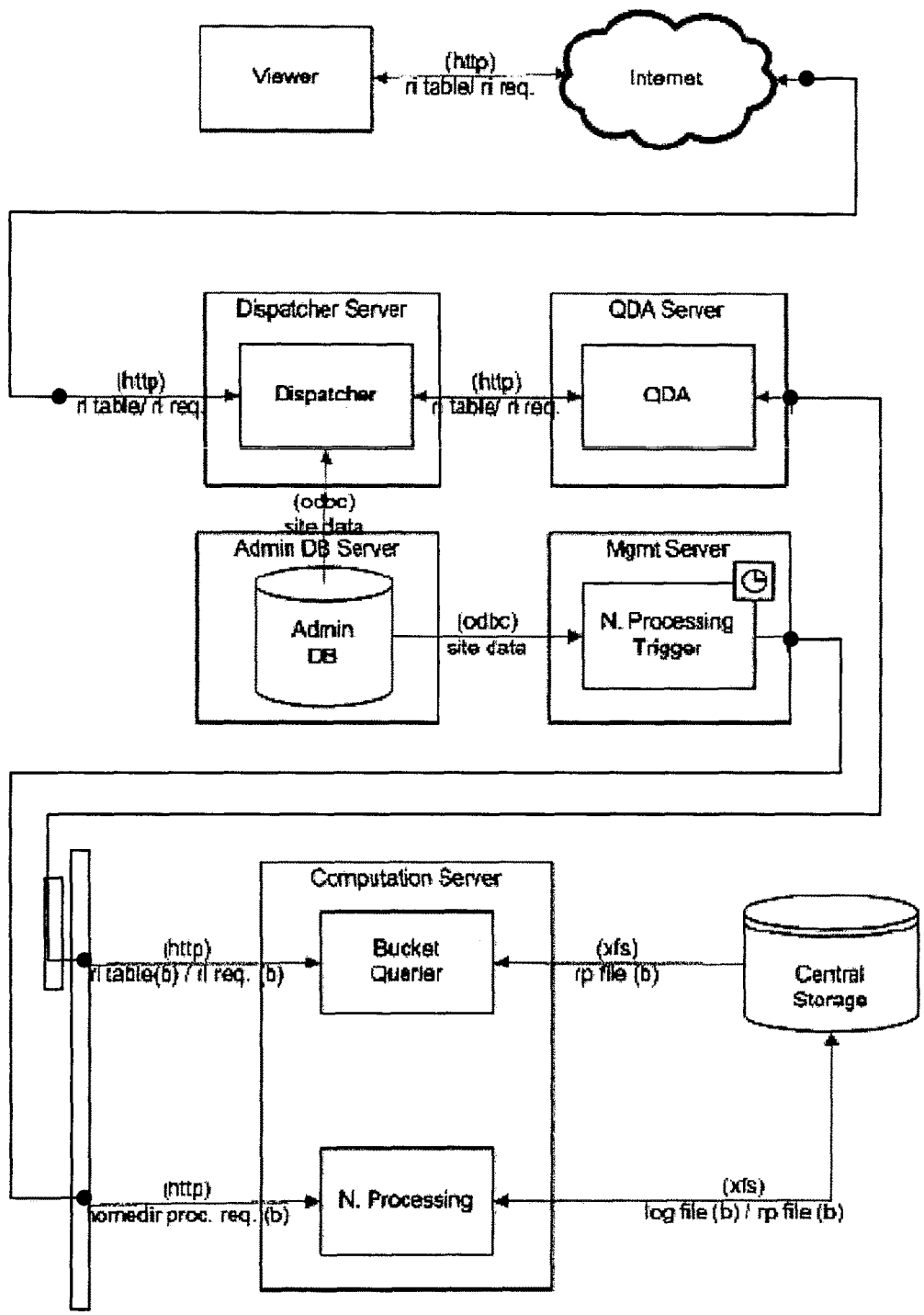
FIG. 6 shows an architectural overview for querying and viewing according to an embodiment of the invention.

FIG. 6 shows an architectural overview for querying and viewing according to an embodiment of the invention. In FIG. 6 internal modules are as shown as blocks, while boxes surrounding the internal modules represent exemplary types of server machines. The arrows between modules represent data flow. The top legend of an arrow (between brackets) describes an exemplary protocol that can be used. The bottom legend of an arrow represents the type of data being transferred. When the dataflow has two directions, the information is separated by a "/". We use "b" to represent an index value for a "bucket". All http requests are load-balanced to a group of servers with the respective module installed.

The AdminDB is a database stored on a computer storage device keeping all information about corporate, sites, users, report definitions, etc. The Requests to the Dispatcher module may come from a GUI or from any module through an external API. The AdminDB module is capable of receiving several types of requests, e.g. datamodel queries and reporting queries. The datamodel queries are handled by itself, getting the data directly from the database. The report item queries are handled in the following way: it gets all the data needed from the Admin DB, generates a report item request and sends it to the QDA. QDA stands for "Query Distributor and Aggregator". The QDA module distributes the original query to all the "Bucket Queriers", waits for the results and then aggregates them into the final result table. The Bucket Querier is responsible for running a query for a single bucket and returning the result table to the QDA. If the query is a today report, it reads the bucket log file and processes it, if not, it reads the rp-files created by the nightly processing for the specified period. The post-processing operations that can run locally to each bucket are also executed by the Bucket Querier. Other operations that combine information of different visitors run on the QDA. The Processing module performs the aggregation of the raw data of a single day for a bucket and keeps the result persistently. The aggregation of the data is done using queries. The result of each query is a table. This aggregation is performed to make the calculation of reports faster. The Nightly Processing Trigger is responsible for starting the nightly processing of each site, according to their specific time zones. It's e.g. a cronjob starting every hour, reading the database and finding all the sites that just crossed a selected time such as midnight. For those sites, it will read all the information needed from the "Admin DB" to build the requests to start the Nightly Processing (one request per bucket).

Figure 7:
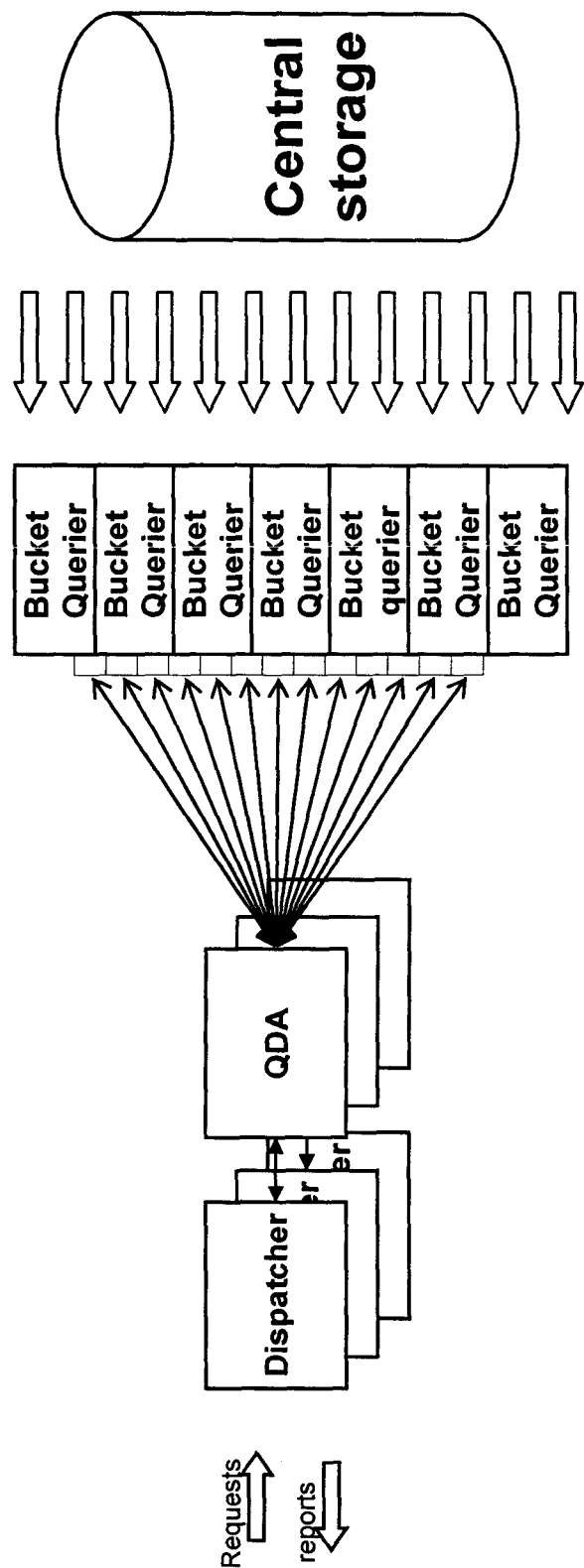
FIG. 7 shows a detail of an architectural overview for querying and viewing according to an embodiment of the invention.

FIG. 7 shows a detail of an architectural overview for querying and viewing according to an embodiment of the invention. The dispatcher receives report requests and passes requests to the QDA. The QDA is aware of the bucket structure and will break up report requests in bucket requests. Each request is sent to a Bucket Querier (BQ). Each BQ has its own processor (Core) to process a single bucket.

For large websites or websites attracting many visitors, potentially a large amount of data is transferred from the central storage to the bucket queriers and then parsed on the bucket queriers. Therefore the pre-processed file format for pre-processed measurement data stored in the central storage is optimized in a way that the amount of data transfer can be limited to only what's necessary. E.g. a simple report like "Total Visitors" doesn't need to transfer the information about referrers or user agents.

Figure 8:
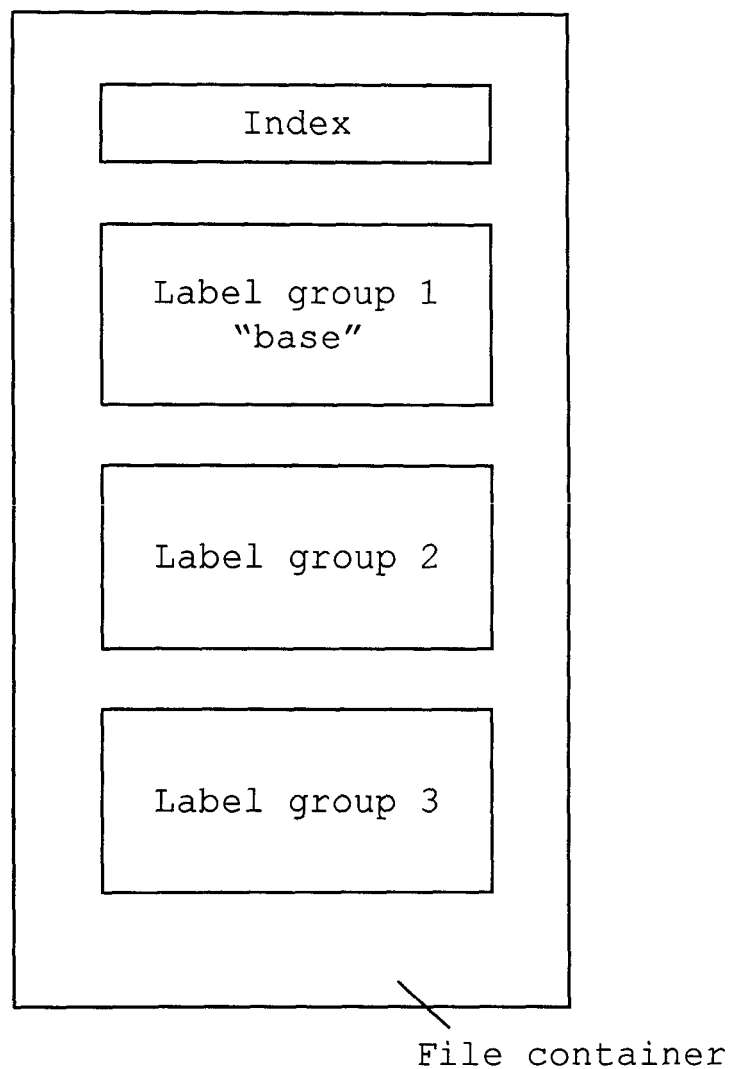
FIG. 8 shows an example of a file container for storing pre-processed measurement data.

In FIG. 8 an example of a file container for storing pre-processed measurement data is shown. Use of a file container allows for only parts of the archive to be transferred to the bucket queriers. It is possible to use another type of file container, which if desired can be compressed. The file container is e.g. a ZIP container.

Report labels are sometimes used together. E.g. if a report needs one label then it might need another label as well.

This defines a grouping on the label names. Labels in a label group are handled together£: they are written in the same part of the container (e.g. ZIP container) and they are read together. There can be a label group called "base" which contains the basic labels that are the most used ones. These are e.g. visitor_id, UTC_time_offset, markers, type and homedirs. Other label groups can be defined. These other label groups are e.g. defined by a configuration file, e.g. called labelgroups.txt. Alternatively the label groups are defined in the container, or in any other suitable manner. Every label that is not listed there and is not a base label will have its own label group. Furthermore a large amount (e.g. thousands) of label groups would result in excessive memory usage. Thus if a predefined threshold is hit, all further labels are put in the same label group. This is to tolerate faulty label name designs.

Optionally the pre-processed ZIP file contains an entry called index, which describes all the label groups in the pre-processed file, possible except for the ones in base. Thus changes in the config file labelgroups.txt do not affect already pre-processed files. Label group names are specified in labelgroups.txt. For every label group that's not specified there but created automatically there but created automatically a name is generated based on the label name it contains. E.g. for the referrer label the group will be called "referrer".

String tables further improve the optimization. This is using the fact that label values are repeated several times: page names, referrers, etc. These strings are stored within a string table and are referenced by an index for every single event. String tables are shared between labels in the same label group. String tables are saved in a zip entry named <labelgroupname>.table. Tables are e.g. text files where content is separated with newlines. The lines are for example: (1) the number of strings in the string table; (2) the value null to represent missing labels; and (3) one string per line until all strings are listed. The null value is included in the count on the first line. The null value represents missing labels; if the label is there on an event but has an empty value then there will be an empty string in the string table. The encoding used for the strings is e.g. UTF-8. Records are binary entries that contain references to the strings in the string table for the labels in a particular label group. Records are saved in the zip entry named <labelgroupname> records. References to the strings start indexing at 0 which will always refer to the null value. Binary entries are e.g. all in big endian byte order. The first byte of a records file contains the number of bits used by each event per label. Legal values are 8, 16, 24 and 32. These bits are used as references to entries in the string table.

Hereunder follows an example with four events and a label group with only one label:

```
c_example_label.table:
3
null
ab
hex dump of c_example_label.records:
08 02 01 02 00
```

Analyzing the bytes of c_example_label.records: byte 1 is 08 thus each event will use one byte for references; byte 2 is 02 thus example_label=b for this event; byte 3 is 01 thus example_label=a for this event; byte 4 is 02 thus example_label=b for this event; byte 5 is 00 thus the example_label label is missing for this event.

Base records are stored in a zip entry named base. Base records describe the values of the base labels of the events. Base records have a different binary format. For each file a UTC base value is calculated. This is approximately 1000 hours earlier than the first event of the day. This enables the usage of an offset per label which will definitely fit into 32 bits. References in the base records refer to strings in the zip entry named base.table. The structure of base records enables skipping events of a visitor if they are not needed or only the first one is needed (e.g. for the Total Visitors report).

The format of the file is for example as follows:

```
8 bytes for the UTC base value;
then for each visitor:
    4 bytes for visitor id: a reference to the visitor
    id in the string table;
    4 bytes for number of events of this visitor;
    then for each event:
        4 bytes for UTC offset; the UTC value of the event is calculated
        by adding this offset to the UTC base;
        4 bytes for marker: a reference to the marker value in the
        string table;
        4 bytes for type: a reference to the type value in the string table;
        4 bytes for homedir: a reference to the homedir value in the
        string table.
```

So-called virtual labels are used to do further optimizations at pre-processing time. These labels don't exist in the original measurement but can be requested from the event. An example is visitor_country, which returns the country of origin of the particular event.

Time values are preferably optimized to minimize the table size for time values (thus reduce memory consumption). The optimization is done with the virtual label called optimized_UTC_time_offset. This only stores the difference between the UTC and the time value. Most of the logfiles will have one offset only with exceptions of days that have a DST change, for instance.

Although the subject matter has been described in a language specific to structural features and/or methodological acts, it is to be understood that the subject matter defined in the appended claims is not necessarily limited to the specific features or acts described above as has been determined by the courts. Rather, the specific features and acts described above are disclosed as example forms of implementing the claims.

Therefore, the following is claimed:

1. A method for processing measurement data for website statistics, comprising:
   receiving, in at least one computing device, the measurement data for a website, wherein the measurement data comprises events associated with behaviors of a plurality of visitors of the website that are each identified based on a corresponding visitor identifier;
   partitioning, in the at least one computing device, the measurement data into visitor sets based on the visitor identifiers, wherein each of the visitor sets comprises measurement data associated with one of the visitors;
   calculating, in the at least one computing device, a hash value for each of the visitor sets based on a respective visitor identifier;
   selecting, in the at least one computing device, one of a plurality of storage buckets for each visitor set based on a respective hash value, wherein the plurality of storage buckets contain log files associated with at least one behavior of corresponding visitors, at least one of the plurality of storage buckets is selected for two or more of the visitor sets;
   storing, by the at least one computing device, portions of the measurement data corresponding to each of the visitor sets in a respective storage bucket, wherein all of the measurement data associated with a respective visitor is selectively configured to be placed in a respective one of the plurality of storage buckets; and
   in response to receiving, from a client device, a query of the measurement data for the website, distributing the query to a plurality of processors that concurrently query the plurality of storage buckets in which the measurement data is stored.

2. The method of claim 1, further comprising dynamically changing, by the at least one computing device, a quantity of the plurality of storage buckets when at least one of the plurality of storage buckets reaches a threshold size.

3. The method of claim 2, further comprising redistributing the measurement data stored in the plurality of storage buckets to be stored across the changed quantity of the plurality of storage buckets.

4. The method of claim 1, further comprising determining, by the at least one computing device, a quantity of the plurality of storage buckets to store the measurement data based on a size of the website.

5. The method of claim 1, further comprising:
   receiving a plurality of results in response to the query distributed to the plurality of processors; and
   aggregating the plurality of results into a report for the client device.

6. The method of claim 1, wherein the measurement data stored in the plurality of storage buckets comprises one or more labels which are grouped into a label group and stored together in one of the plurality of storage buckets.

7. The method of claim 6, wherein the measurement data stored in the plurality of storage buckets includes a compressed ZIP file containing an index describing the label group.

8. A non-transitory computer-readable medium embodying a program for processing measurement data for website statistics, the program comprising code that when executed by at least one computing device causes the at least one computing device to:
   receive the measurement data for a website, wherein the measurement data comprises events associated with behaviors of a plurality of visitors of the website that are each identified based on a corresponding visitor identifier;
   partition the measurement data into visitor sets based on the visitor identifiers, wherein each of the visitor sets comprises measurement data associated with one of the visitors;

calculate a hash value for each of the visitor sets based on a respective visitor identifier;

select one of a plurality of storage buckets for each visitor set based on a respective hash value, wherein the plurality of storage buckets contain log files associated with at least one behavior of corresponding visitors, at least one of the plurality of storage buckets is selected for two or more of the visitor sets;

store portions of the measurement data corresponding to each of the visitor sets in a respective storage bucket, wherein all of the measurement data associated with a respective visitor is selectively configured to be placed in a respective one of the plurality of storage buckets; and in response to receiving, from a client device, a query of the measurement data for the website, distribute the query to a plurality of processors that concurrently query the plurality of storage buckets in which the measurement data is stored.

9. The non-transitory computer-readable medium of claim 8, wherein the program further comprises code causing the at least one computing device to dynamically change a quantity of the plurality of storage buckets when at least one of the plurality of storage buckets reaches a threshold size.

10. The non-transitory computer-readable medium of claim 9, wherein the program further comprises code causing the at least one computing device to redistribute the measurement data stored in the plurality of storage buckets to be stored across the changed quantity of the plurality of storage buckets.

11. The non-transitory computer-readable medium of claim 8, wherein the program further comprises code causing the at least one computing device to determine a quantity of the plurality of storage buckets to store the measurement data based on a size of the website.

12. The non-transitory computer-readable medium of claim 8, wherein the program further comprises code causing the at least one computing device to:
receive a plurality of results in response to the query distributed to the plurality of processors; and
aggregate the plurality of results into a report for the client device.

13. The non-transitory computer-readable medium of claim 8, wherein the measurement data stored in the plurality of storage buckets comprises one or more labels which are grouped into a label group and stored together in one of the plurality of storage buckets.

14. A system, comprising:
at least one hardware computing device; and
a program executed in the at least one computing device, the program comprising code that causes the at least one computing device to:
receive the measurement data for a website, wherein the measurement data comprises events associated with behaviors of a plurality of visitors of the website that are each identified based on a corresponding visitor identifier;

partition the measurement data into visitor sets based on the visitor identifiers, wherein each of the visitor sets comprises measurement data associated with one of the visitors;

calculate a hash value for each of the visitor sets based on a respective visitor identifier;

select one of a plurality of storage buckets for each visitor set based on a respective hash value, wherein the plurality of storage buckets contain log files associated with at least one behavior of corresponding visitors, at least one of the plurality of storage buckets is selected for two or more of the visitor sets;

store portions of the measurement data corresponding to each of the visitor sets in a respective storage bucket, wherein all of the measurement data associated with a respective visitor is selectively configured to be placed in one of the plurality of storage buckets; and in response to receiving, from a client device, a query of the measurement data for the website, distribute the query to a plurality of processors that concurrently query the plurality of storage buckets in which the measurement data is stored.

15. The system of claim 14, wherein the program further comprises code causing the at least one computing device to dynamically change a quantity of the plurality of storage buckets when at least one of the plurality of storage buckets reaches a threshold size.

16. The system of claim 15, wherein the program further comprises code causing the at least one computing device to redistribute the measurement data stored in the plurality of storage buckets to be stored across the changed quantity of the plurality of storage buckets.

17. The system of claim 14, wherein the program further comprises code causing the at least one computing device to determine a quantity of the plurality of storage buckets to store the measurement data based on a size of the website.

18. The system of claim 14, wherein the program further comprises code causing the at least one computing device to:
receive a plurality of results in response to the query distributed to the plurality of processors; and
aggregate the plurality of results into a report for the client device.

19. The system of claim 14, wherein the measurement data stored in the plurality of storage buckets comprises one or more labels which are grouped into a label group and stored together in one of the plurality of storage buckets.

20. The system of claim 19, wherein the measurement data stored in the plurality of storage buckets includes a compressed ZIP file containing an index describing the label group.

* * * * *